(12) United States Patent
Imamura et al.

(10) Patent No.: US 10,946,863 B2
(45) Date of Patent: Mar. 16, 2021

(54) WHEEL LOAD ESTIMATION METHOD FOR FOUR-WHEEL DRIVE VEHICLE

(71) Applicant: Mazda Motor Corporation, Hiroshima (JP)

(72) Inventors: Yasumasa Imamura, Hiroshima (JP); Yasushi Yagi, Hiroshima (JP); Akihiro Tatara, Aki-gun (JP); Keisuke Haruta, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 86 days.

(21) Appl. No.: 16/116,808

(22) Filed: Aug. 29, 2018

(65) Prior Publication Data

US 2019/0061770 A1 Feb. 28, 2019

(30) Foreign Application Priority Data

Aug. 31, 2017 (JP) .............................. JP2017-166436

(51) Int. Cl.
*B60W 40/13* (2012.01)

(52) U.S. Cl.
CPC ......... *B60W 40/13* (2013.01); *B60W 2300/18* (2013.01); *B60W 2510/105* (2013.01); *B60W 2520/105* (2013.01); *B60W 2520/125* (2013.01)

(58) Field of Classification Search
CPC .............. B60W 40/13; B60W 2300/18; B60W 2510/105; B60W 2520/105; B60W 2520/125
See application file for complete search history.

(56) References Cited

U.S. PATENT DOCUMENTS

| | | | |
|---|---|---|---|
| 9,290,176 B2 | 3/2016 | Yamashita | |
| 9,823,111 B2 | 11/2017 | Asano et al. | |
| 2002/0153770 A1* | 10/2002 | Matsuno | B60T 8/172 303/146 |
| 2010/0174463 A1* | 7/2010 | Uragami | B60T 8/1755 701/70 |
| 2013/0138288 A1* | 5/2013 | Nickolaou | B60W 40/13 701/23 |
| 2014/0039772 A1* | 2/2014 | Jensen | B60K 23/0808 701/69 |

(Continued)

FOREIGN PATENT DOCUMENTS

| | | |
|---|---|---|
| JP | 5793877 B2 | 10/2015 |
| JP | 5858051 B2 | 2/2016 |
| JP | 5867131 B2 | 2/2016 |

*Primary Examiner* — Navid Ziaeianmehdizadeh
*Assistant Examiner* — Sean P Quinn
(74) *Attorney, Agent, or Firm* — Alleman Hall Creasman & Tuttle LLP

(57) ABSTRACT

A wheel load estimation method of a four-wheel drive vehicle driven by a rotational driving device comprises a correlation relationship setting step for previously setting a correlation relationship between a total weight and at least one of the front wheel load and the rear wheel load by variously changing a movable load of the vehicle, a total vehicle weight computation step for calculating a current total vehicle weight from an output torque of the rotational driving device and a longitudinal acceleration of the vehicle corresponding to the output torque, and a wheel load estimation step for estimating the wheel load of at least a driving wheel from the correlation relationship and the total vehicle weight.

13 Claims, 6 Drawing Sheets

(56) References Cited

U.S. PATENT DOCUMENTS

| | | | | |
|---|---|---|---|---|
| 2014/0244120 A1* | 8/2014 | Fujii | .................... | B60W 10/06 |
| | | | | 701/58 |
| 2014/0277867 A1* | 9/2014 | Nedorezov | ........... | B60W 10/06 |
| | | | | 701/22 |
| 2016/0318401 A1* | 11/2016 | Mogi | ...................... | B60L 15/20 |
| 2018/0194357 A1* | 7/2018 | Hall | ..................... | B60W 20/15 |
| 2018/0245966 A1* | 8/2018 | Mittal | .................. | G01G 19/086 |

* cited by examiner

WHEEL LOAD ESTIMATION METHOD FOR FOUR-WHEEL DRIVE VEHICLE

FIELD OF THE INVENTION

The present invention relates to a wheel load estimation method of a four-wheel drive vehicle, specifically a method of estimating a wheel load of a four-wheel drive vehicle that utilizes a predetermined correlation relationship between a total weight and at least one of a front wheel load and a rear wheel load, that is computed as a result of variously changing the loading of the vehicle.

BACKGROUND ART

Many four-wheel drive vehicles are designed to set the front wheels as main driving wheels, set the rear wheels as auxiliary driving wheels, and suppress slip of the front wheels by appropriately distributing part of the driving force of the engine to the rear wheels according to a road surface condition or a frictional coefficient.

Since slip of a front wheel occurs when the combined resultant force of the driving force and the lateral force of the front wheel is larger than a friction force, which is determined by a front wheel load and a road surface frictional coefficient, it is important to accurately obtain or estimate the front wheel load for controlling the driving force distribution of the four-wheel drive vehicle.

The control device of the four-wheel drive vehicle described in Patent Document 1 controls the distribution of the driving force to the front wheel and the rear wheel so as to minimize the total amount of driving loss based on front wheel slip, driving loss based on rear wheel slip, and mechanical driving loss generated by the rear wheel drive.

The steering wheel axle load estimating device described in Patent Document 2 estimates a steering wheel axle load by using the steering angle differentiation between the steering angle during straight traveling in a no load condition and the steering angle during straight travelling in a loaded condition, each of which is detected by a steering sensor, for vehicles having a pitman arm in their steering mechanism.

The loading condition estimating technique of the vehicle described in Patent Document 3 estimates a vehicle weight and a loading condition of the vehicle by using a relationship between the loading condition of the vehicle, a stability factor of the vehicle, and lateral acceleration in order to estimate the loading condition of the vehicle during traveling circumstances of various vehicles.

PRIOR ART DOCUMENTS

Patent Document

[PATENT DOCUMENT 1] Japanese Patent No. 5793877
[PATENT DOCUMENT 2] Japanese Patent No. 5867131
[PATENT DOCUMENT 3] Japanese Patent No. 5858051

SUMMARY OF THE INVENTION

Problems to be Solved by the Invention

For a four-wheel drive vehicle having front wheels as main driving wheels and rear wheels as auxiliary driving wheels, conventionally, in order to increase the accuracy of the driving force distribution to the front wheels and the rear wheels, there has been a need to determine the wheel loads of the front wheels and the rear wheels accurately.

Now, it is possible to estimate the total weight of the vehicle from the driving torque of the vehicle and the longitudinal acceleration. However, since the front wheel load and the rear wheel load are presumed to vary greatly depending on the loading condition of cargo loaded on the vehicle and thus accuracy of an estimate may deteriorate, conventionally, an estimate of the total vehicle weight has not been used for estimating driving wheel load.

In the technique described in Patent Document 1, there is no teaching related to wheel load because front wheel load and rear wheel load are not used for controlling driving force. The technique of Patent Document 2 cannot be applied to a vehicle that does not have a pitman arm in its steering mechanism, so vehicles to which the technique may be applied are extremely limited. In the technique of Patent Document 3, although it is possible to know the loading condition (rear loaded, center loaded, and front loaded) and weight of the vehicle, it is not possible to individually know the wheel loads of the front wheel and the rear wheel.

One purpose of the present invention is to provide a method of estimating a wheel load of a four-wheel drive vehicle by using a predetermined correlation relationship between a total weight and at least one of the front wheel load and the rear wheel load, by variously changing the loading of the vehicle.

BRIEF SUMMARY OF THE INVENTION

The wheel load estimation method of a four-wheel-drive vehicle driven by a rotational driving device according to a first aspect of the present invention includes a correlation relationship setting step of obtaining a correlation relationship between a total weight and at least one of the front wheel load and the rear wheel load by variously changing a movable load of a vehicle, a total vehicle weight computation step of calculating a current total vehicle weight from an output torque of the rotational driving device and a longitudinal acceleration of the vehicle corresponding to the output torque, and a wheel load estimation step of estimating the wheel load of at least the driving wheel from the correlation relationship and the total vehicle weight.

The applicant experimented with vehicles according to their vehicle type, by varying the load weight and the loading conditions, as a result, regardless of the loading condition, the applicant surely recognized that there is a certain correlation relationship between the total weight and the front wheel load and the rear wheel load, and could achieve the present invention.

According to the above configuration, in the correlation relationship setting step, through experiments conducted in advance of calculating a current total vehicle weight, a correlation relationship is obtained between a change in a total vehicle weight as a change in the movable load occurs by, for example, a change in the number and position of occupants and cargo in the vehicle, and a corresponding change in at least one of a front wheel load and a rear wheel load. It will be appreciated that the experiments may be carried out in the real-world via actual measurements under these various loading conditions, or via physics simulation software on a suitable computing device that computes simulated loads experienced under simulated loading conditions. From this correlation relationship and the total vehicle weight obtained at the total vehicle weight computation step, the wheel load of at least the driving wheel is estimated (referred to as a "wheel load estimation step").

If the correlation relationship is appropriately set, the accuracy of the estimated wheel load of the driving wheel can be improved.

According to a second aspect of the present invention, the vehicle is one of a plurality of types of vehicles, and the correlation relationship for each type of the plurality of types of vehicles is stored in non-volatile memory of a control unit.

According to the above configuration, since a correlation relationship is set for each type of vehicle, it is sufficient to set only one correlation relationship for each vehicle type, and so the correlation relationship can be easily set.

According to a third aspect of the present invention, the correlation relationship is set by a front wheel load calculation formula and a rear wheel load calculation formula respectively set with the total weight as a parameter.

According to the above configuration, by applying the total weight respectively to the front wheel load calculation formula and the rear wheel load calculation formula, the front wheel load and the rear wheel load can be easily calculated.

According to a fourth aspect of the present invention, the correlation relationship is set by a front wheel load ratio calculation formula and a rear wheel load ratio calculation formula in which the ratio to the total weight is respectively set with the total weight as a parameter.

According to the above configuration, by applying the total weight respectively to the front wheel load ratio calculation formula and the rear wheel load ratio calculation formula, a front wheel load ratio and a rear wheel load ratio are calculated, so that the front wheel load and the rear wheel load can be easily calculated.

According to a firth aspect of the present invention, the four-wheel drive vehicle is a four-wheel drive vehicle having front wheels as main driving wheels.

According to the above configuration, in the four-wheel drive vehicle having the front wheels as the main driving wheels, the wheel load estimation method of the present invention can be effectively used for the control of distributing a part of the driving force to the rear wheels.

Effects of the Invention

According to the present invention, various effects as described above can be obtained.

DETAILED DESCRIPTION OF THE EMBODIMENTS

Embodiments for carrying out the present invention will be described based on the following example embodiments.

Example Embodiments

Figure 1:
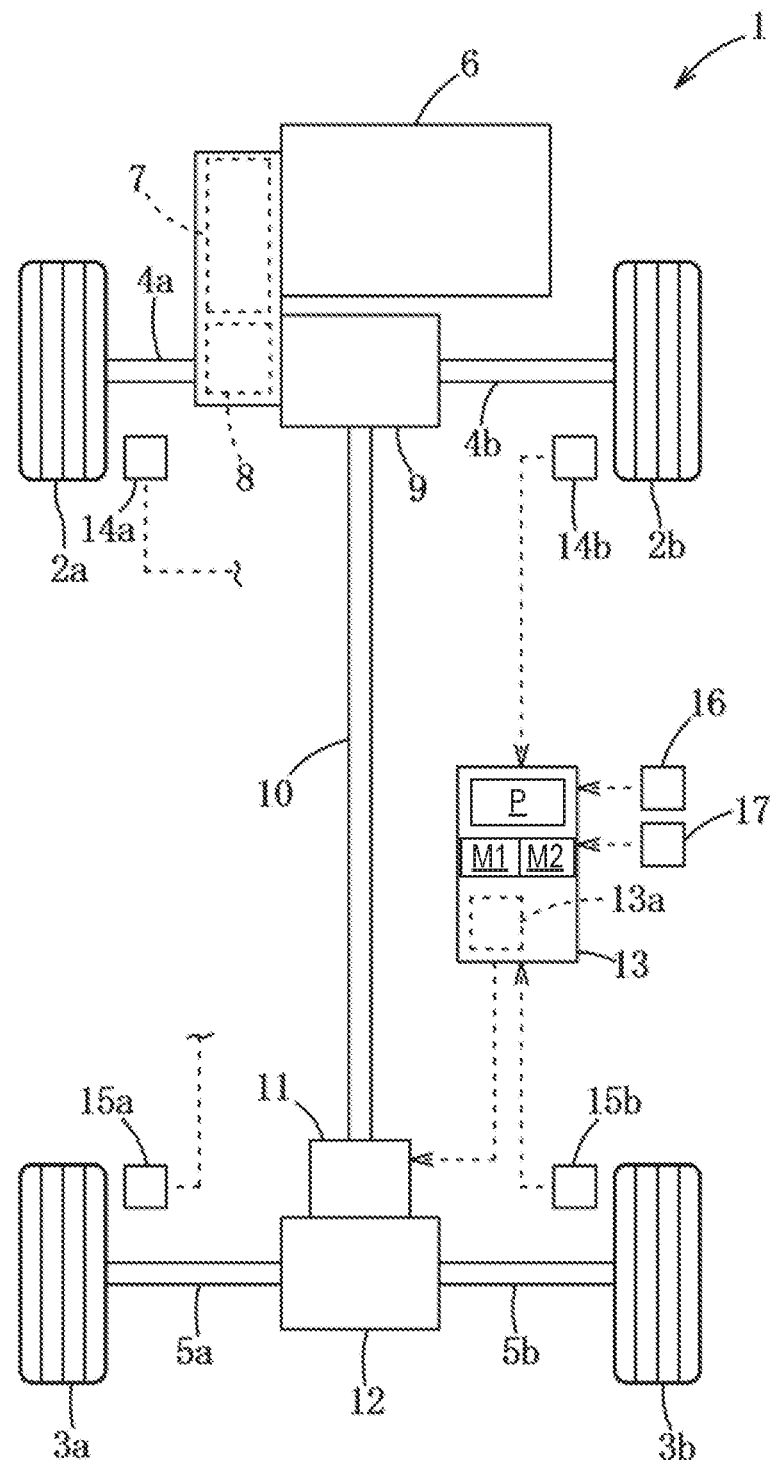
FIG. 1 is a schematic configuration diagram of a drive system of a four-wheel drive vehicle based on a front wheel drive according to an embodiment of the present invention.

As shown in FIG. 1, a four-wheel drive vehicle 1 based on a front wheel drive comprises left and right front wheels 2a and 2b, left and right rear wheels 3a and 3b, front wheel axles 4a and 4b, rear wheel axles 5a and 5b, an engine 6 (a driving means), a transmission 7, a front wheel differential gear device 8, a transfer case 9 for transmitting the driving force from the transmission 7 to the rear wheels 3a and 3b, a driving force transmission shaft 10, a coupling 11, a rear wheel differential gear device 12, and a control unit 13. The control unit 13 typically includes a processor P and associated non-volatile memory M1 and volatile memory M2, the non-volatile memory M1 storing program instructions that when executed by the processor P using portions of the volatile memory M1, cause the processor P to perform the functions of the control unit 13 described herein.

The driving force of the engine 6 is transmitted to the front wheel differential gear device 8 after being shifted in the transmission 7, and the driving force is transmitted from the front wheel axles 4a and 4b connected to the front wheel differential gear device 8 to the left and right front wheels 2a and 2b. A part of the driving force of the engine 6 is transmitted to the driving force transmission shaft 10 via the transfer case 9 so as to control the driving force to be distributed to the rear wheels 3a and 3b in the coupling 11. An input shaft of the coupling 11 is connected to a rear end of the driving force transmission shaft 10 and an output shaft of the coupling 11 is connected to a drive pinion of the rear wheel differential gear device 12. The coupling 11 is configured to be capable of controlling the rear wheel driving force to be distributed to the rear wheel differential gear device 12 via an internal electromagnetic clutch mechanism.

Detection signals from various sensors such as front wheel speed sensors 14a and 14b, rear wheel speed sensors 15a and 15b, a lateral acceleration sensor 16, a longitudinal acceleration sensor 17 and the like are inputted to the control unit 13. The control unit 13 transmits and receives various signals to and from the engine 6, transmission 7, steering mechanism, shift lever, accelerator pedal, brake pedal and the like, and controls the engine 6 and the transmission 7.

Figure 6:
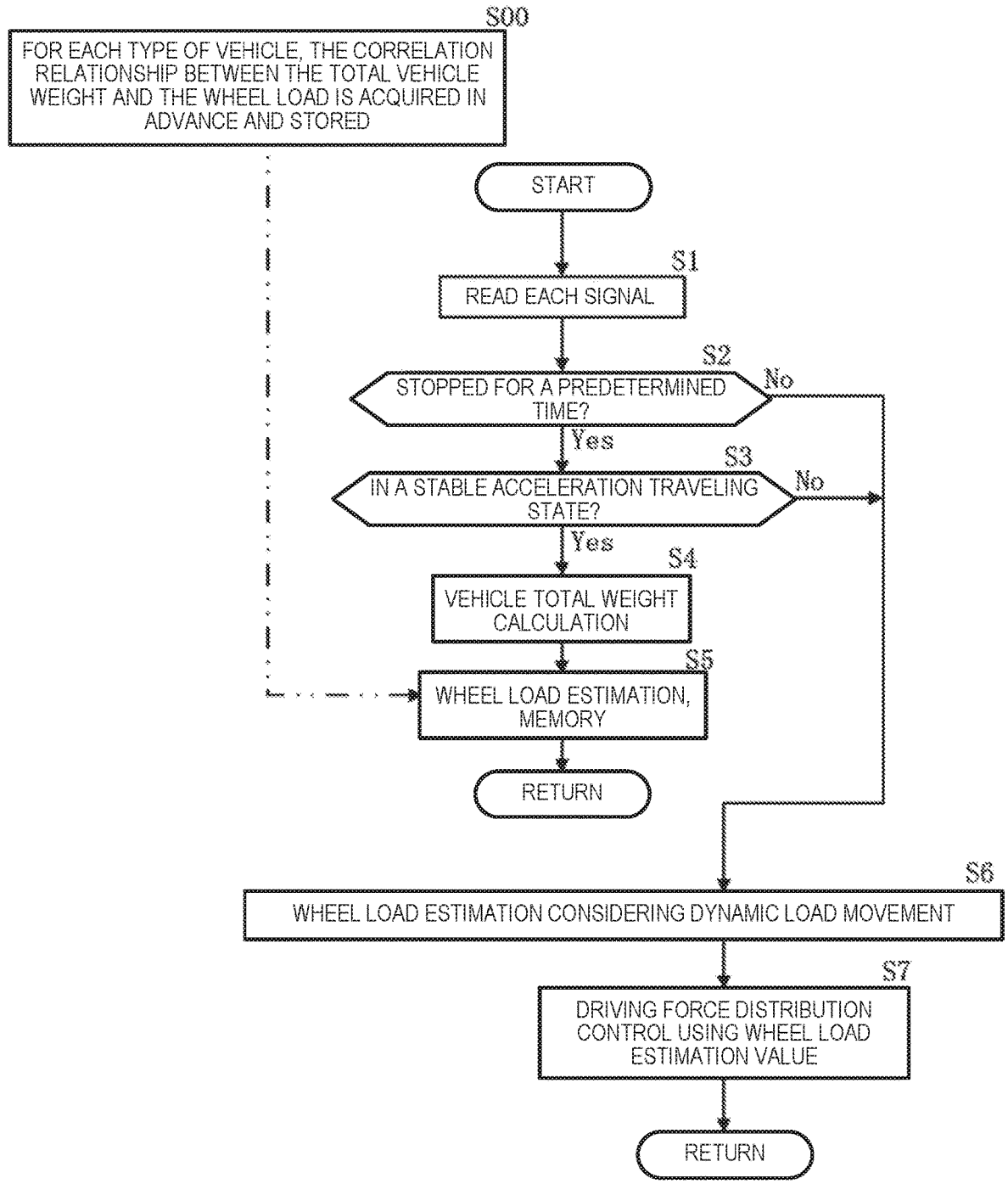
FIG. 6 is a flow chart of a wheel load estimation control of a four-wheel drive vehicle.

The control unit 13 includes a TRC 13a (traction control unit) that performs a slip suppression control. A control program for the wheel load estimation control of the four-wheel drive vehicle as well as the correlation relationship of step S00 shown in FIG. 6 are stored in non-volatile memory M1 of the control unit 13. The traction control unit 13a may be implemented via the processor P and associated non-volatile memory M1 and volatile memory M2 of the control unit 13, or the traction control unit 13a may include an independent processor and associated non-volatile and volatile memory specifically for the traction control unit 13a.

The wheel load estimation method of a four-wheel-drive vehicle driven by a rotational driving device (e.g., a prime mover such as an engine or motor with rotational output) according to the present embodiment has a correlation relationship setting step of obtaining or predetermining a correlation relationship between a total weight and at least one of the front wheel load and the rear wheel load by variously changing a movable load in the vehicle by, for example, changing a number or position of occupants and/or cargo in the vehicle, a total vehicle weight computation step of calculating a current total vehicle weight from an output torque of the rotational driving device and a longitudinal acceleration of the vehicle corresponding to the output torque, and a wheel load estimation step of estimating the wheel load of at least the driving wheel from the correlation relationship and the total vehicle weight.

Next, the wheel load estimation control of the four-wheel drive vehicle will be described in detail with reference to FIG. 2 to FIG. 6. Moreover, each Si (i=1, 2, . . . ) in FIG. 6 indicates a different step.

[Correlation Relationship Setting Step] (with Reference to S00 of FIG. 6, FIG. 2, and FIG. 3 to FIG. 5)

For the four-wheel drive vehicle 1, the correlation relationship between a total vehicle weight and at least one of the front wheel load and the rear wheel load is set in advance of calculating the current total vehicle weight, by variously changing the movable load and the loading condition. However, as the correlation relationship also changes if the vehicle type changes, this correlation relationship is to be set for each type of vehicle from among a plurality of vehicles.

Figure 2:
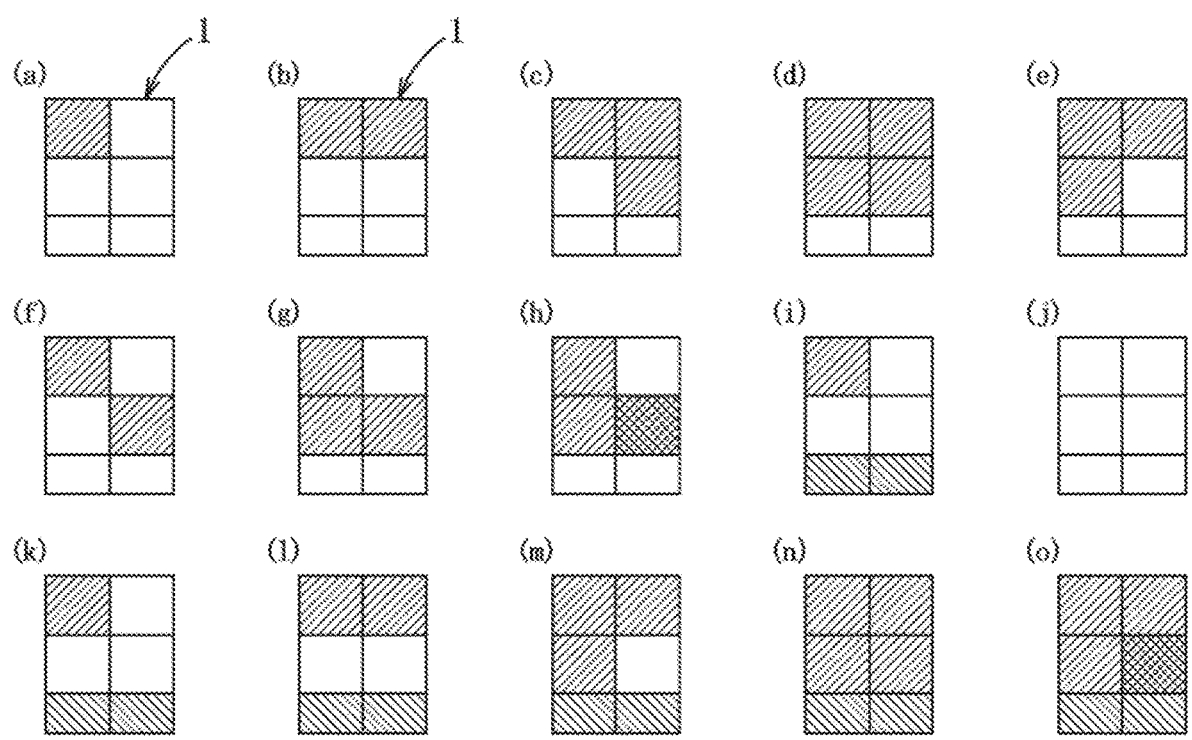
FIG. 2 at (a) through (o) shows respective explanatory drawings of loading condition in which a movable load and loading condition of the four-wheel drive vehicle are variously changed.
Figure 3:
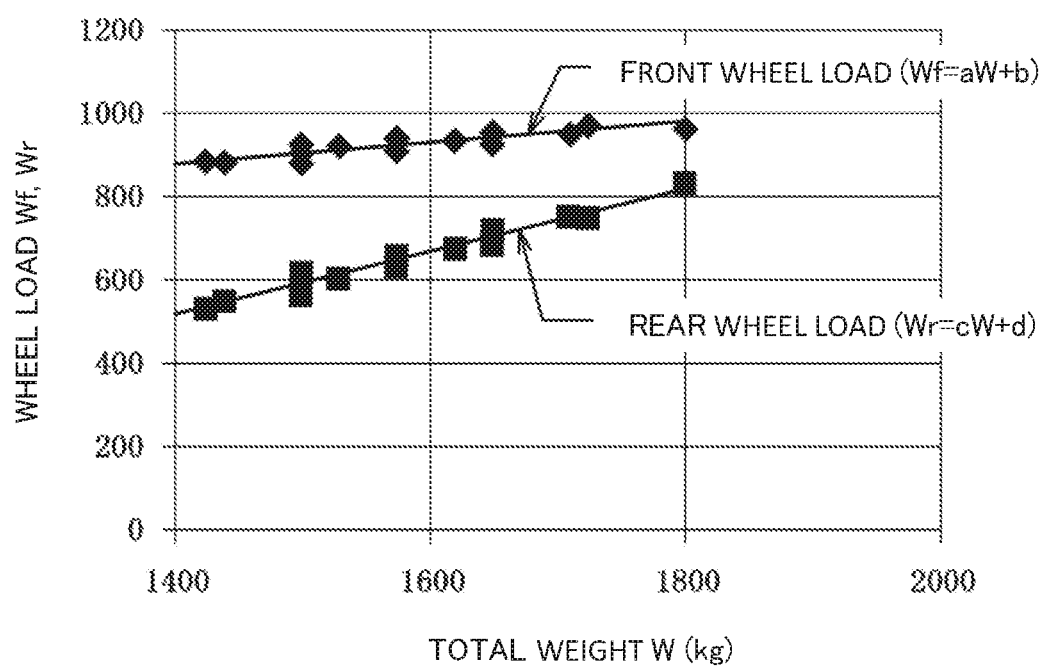
FIG. 3 is a diagram showing a correlation relationship between a total weight of a vehicle and a wheel load.

FIG. 2 (a) to (o) show a state in which the movable load and the loading condition are variously changed in the four-wheel drive vehicle 1, and the results of measuring the front wheel load and the rear wheel load in such various loading conditions and in the vehicle stopped state are shown in FIG. 3.

Moreover, in FIG. 2 (a) to (o), although there are three rows of seats, people ride mainly in the front two rows and cargo is loaded on the third row of seats. The hatched line part of each seat indicates a state in which an adult man with a weight of 75 kg is on board, the double hatched line part (cross hatching part) shows a state in which two adult men with a weight of 75 kg are on board, and on the third row of seats shows a state in which any one of cargo of 30, 45, and 75 kg is loaded.

As shown in FIG. 3, even when the movable load and the loading condition are variously changed, a linear correlation relationship with small deviations was found between the total weight of the vehicle and the front wheel load, and between the total weight of the vehicle and the rear wheel load.

The linear correlation relationship between the total vehicle weight and the front wheel load may be expressed as Wf=aW+b (Equation 1), where W is the total weight of the vehicle, Wf is the front wheel load, and a and b are constants, and the linear correlation relationship between the total vehicle weight and the rear wheel load may be expressed as Wr=cW+d (Equation 2), where W is the total weight of the vehicle, Wr is the rear wheel load, and c and d are constants.

The above Equation 1 and Equation 2 are stored in non-volatile memory of the control unit 13 in advance of calculating the current total weight of the vehicle, e.g., when vehicle car is assembled in a factory or when the non-volatile memory is updated via an authorized service establishment or service.

However, since Wr can be calculated from the total weight W and the front wheel load Wf, and since the front wheel load Wf can be calculated from the total weight W and the rear wheel load Wr, either one of the above Equation 1 or Equation 2 may be stored in the control unit 13 in advance.

The correlation relationships may be set by a front wheel load ratio calculation formula and a rear wheel load ratio calculation formula in which the ratio to the total weight W is respectively set with the total weight W as a parameter.

Figure 4:
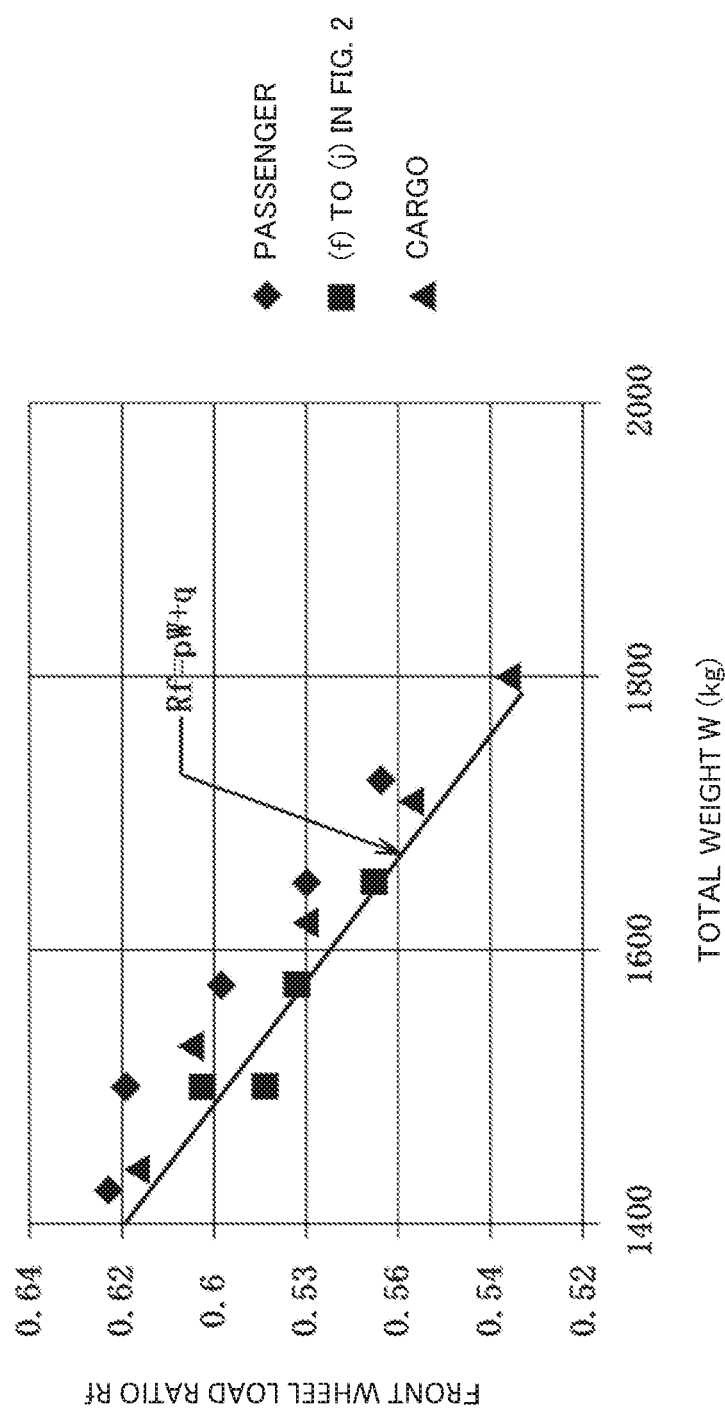
FIG. 4 is a diagram showing a correlation relationship between a total weight of a vehicle and a front wheel load ratio.

The front wheel load Wf in FIG. 3 is represented by the front wheel load ratio Rf corresponding to the total weight W, as shown in FIG. 4. The front wheel load ratio calculation formula can be described by the equation of the front wheel load ratio Rf=pW+q (where p and q are constants).

Figure 5:
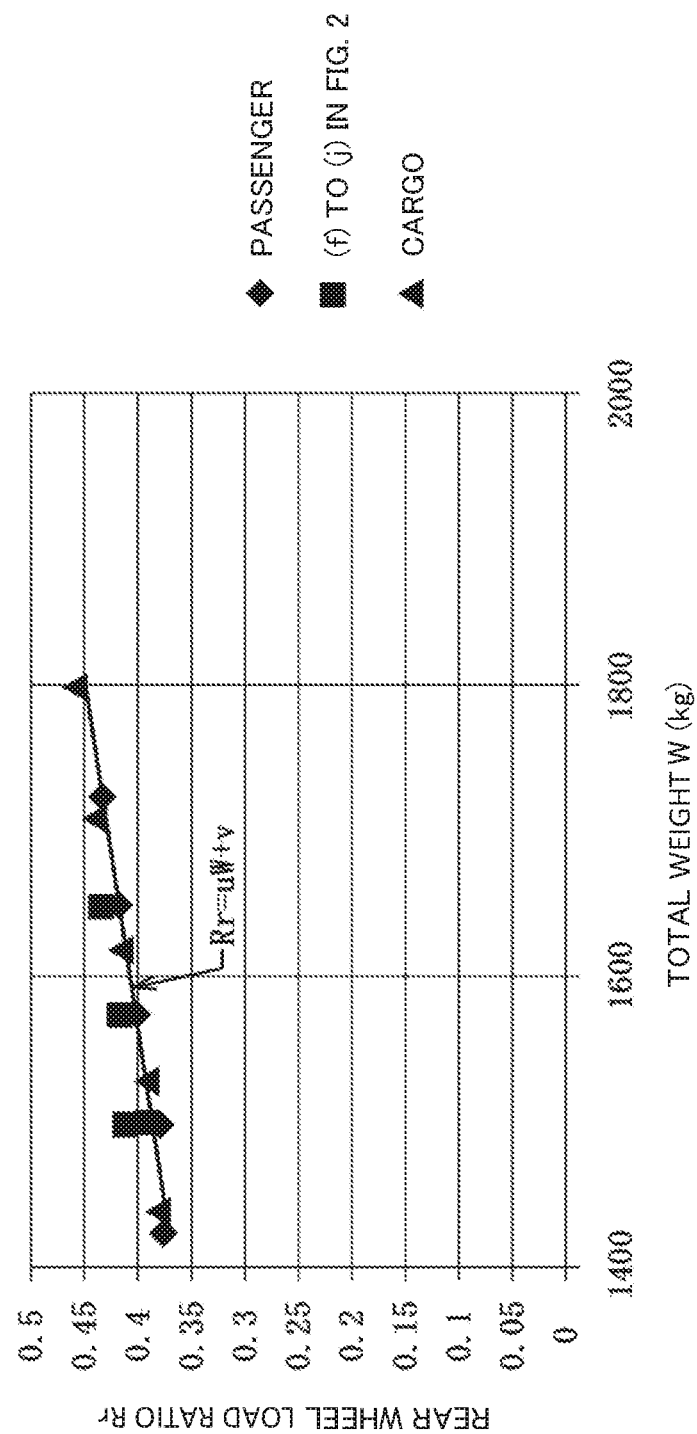
FIG. 5 is a diagram showing a correlation relationship between a total weight of a vehicle and a rear wheel load ratio.

The rear wheel load Wr in FIG. 3 is represented by the rear wheel load ratio Rr corresponding to the total weight W, as shown in FIG. 5. The rear wheel load ratio calculation formula can be described by the rear wheel load ratio Rr=uW+v (where u and v are constants).

Next, the wheel load estimation control of the four-wheel drive vehicle will be described based on the flowchart of FIG. 6. This control is started together with the start of traveling of the vehicle, and at first in S1, various signals necessary for the following steps are read in.

Next, in S2, it is determined whether the vehicle has stopped for a period of time that is equal to or more than a predetermined period of time or not (for example, equal to or more than 30 seconds). When the vehicle is determined to have stopped for a period of time equal to or more than the predetermined period of time, since there is a possibility that loading and unloading of the cargo on the vehicle have been performed and the total weight W of the vehicle might have changed, the process shifts to S3 when the determination of S2 is Yes.

In S3, it is determined whether the vehicle is in a stable acceleration traveling state in the horizontal direction or not. When the determination is YES and the vehicle is in a stable acceleration traveling state, the total vehicle weight calculation is executed in S4, for example, using the following equation:

$$\text{Vehicle total mass } M = (\text{Driving wheel torque } To - \text{Various resistances } R)/(\text{Tire radius} \times \text{Acceleration } A) \quad \text{(Equation 3)}$$

Moreover, the driving wheel torque To is calculated as a value, which is the TM output torque output from the transmission 7 multiplied by a predetermined constant determined by a gear ratio of the transfer case 9, a gear ratio of the coupling 11, a gear ratio of the rear wheel differential gear device 11, and the like.

Various resistances R include tire rotational resistance, rolling resistance and air resistance. Since these resistances are substantially proportional to the vehicle speed, in the present embodiment, they may be calculated as follows: Various resistances R=Vehicle speed V×K (where K is a predetermined constant). Moreover, the vehicle speed V can be calculated by using the detection signals of four of the wheel speed sensors 14a, 14b, 15a, and 15b.

The above total vehicle weight W is calculated by the equation: Total vehicle weight W=Vehicle total mass M×G (where G is gravitational acceleration).

Next, at S5, the wheel load of the driving wheels is estimated and stored in the memory. At the time of estimating the wheel load, by applying the total vehicle weight W calculated as set forth above in the pre-stored Equation 1 and Equation 2, the front wheel load Wf and the rear wheel load Wr are calculated, and if the vehicle is in the front wheel drive state, the front wheel load Wf is set as the wheel load of the driving wheel, and if the vehicle is in the four-wheel drive state, the front wheel load Wf and the rear wheel load Wr are set as the wheel load of the driving wheel. (It will be appreciated that the four-wheel-drive vehicle may have a front wheel mode and a four-wheel-drive mode, selectable either by the user or according to program logic according to driving conditions.) After this S5 is executed, the process returns as shown.

If the determination of S2 and S3 is No, the process flows to S6, and the wheel load considering the dynamic load movement is estimated at S6. The dynamic load movement includes a load movement by the longitudinal acceleration A of the vehicle and a load movement by the lateral acceleration B of the vehicle.

If the longitudinal acceleration is A, the centroid height of the vehicle is H, and the wheel base is L, the reduction amount Δ W of the front wheel load Wf by the longitudinal acceleration A is expressed by the following equation.

Reduction amount Δ$W$=Longitudinal acceleration $A$×Centroid height $H$×Total vehicle weight $W$/Wheel base $L$ Therefore, it is presumed that the front wheel load Wf becomes (Wf−ΔW) and the rear wheel load Wr becomes (Wr+ΔW).

On the other hand, if the lateral acceleration during turning traveling is B, the centroid height of the vehicle is H, and the tread is D, the increment amount ΔWo of the wheel load of the front and rear turning outer wheels by the lateral acceleration B is expressed by the following equation.

Increment amount Δ$Wo$=Lateral acceleration $B$×Centroid height $H$×Total vehicle weight $W$/tread $D$ Therefore, in the case of the front wheel load Wf and the rear wheel load Wr, the wheel loads of the turning outer wheel and the turning inner wheel by the lateral acceleration B are as follows.

Wheel load of turning outer wheel of front wheel= (Front wheel load $Wf$+Increment amount Δ$Wo$)/2

Wheel load of turning inner wheel of front wheel= (Front wheel load $Wf$−Increment amount Δ$Wo$)/2

Wheel load of turning outer wheel of rear wheel= (Front wheel load $Wr$+Increment amount Δ$Wo$)/2

Wheel load of turning inner wheel of rear wheel= (Front wheel load $Wr$−Increment amount Δ$Wo$)/2

At S7, subsequent to S6, using the estimated values of the wheel loads of the front wheels 2a and 2b and the rear wheels 3a and 3b estimated as described above, the driving force distribution control for distributing a part of the driving force to the rear wheel drive is executed, and then the process flow returns as shown. This driving force distribution control is a control to distribute a part of the driving force to the rear drive wheels while limiting the driving force of the front wheels 2a and 2b so that the resultant force of the driving force acting on the tires of the front wheels and the lateral forces acting thereon do not exceed the front wheel load Wf×road surface friction coefficient μ for each front wheel. The process flow returns after S7.

The operation and effects of the wheel load estimation method for a four-wheel drive vehicle explained above will now be described.

As a result of experiments in which the loading weights and the loading conditions for vehicles of different vehicle types were performed, it was determined that there is a fixed correlation relationship between the total weight W and each of the front wheel load Wf and the rear wheel load Wr irrespective of the loading conditions. Accordingly, one or more correlation relationships between the total weight W and at least one of the front wheel load Wf and the rear wheel load Wr is previously obtained by variously changing the movable load of the vehicle in this manner and stored in the control unit non-volatile memory in advance. Then, a current total vehicle weight is calculated from an output torque of the rotational driving device and a longitudinal acceleration of the vehicle corresponding to the output torque, and the wheel load of at least the driving wheel is estimated from the correlation relationship and the total vehicle weight W. Therefore, if the correlation relationship is set appropriately, the wheel load of at least the driving wheel can be accurately estimated by using the correlation relationship.

The wheel load of the driving wheel can be effectively utilized for determining the presence or absence of the possibility of slip of the main driving wheels (front wheels) and for controlling the distribution of a part of the driving force of the engine to the driving of the auxiliary driving wheels (rear wheels).

A correlation relationship is typically set for each type of vehicle among a plurality of types of vehicles, but since it is sufficient to set one correlation relationship for each vehicle type, it can be easily set and excellent in practicality.

Since the correlation relationship is set by the front wheel load calculation formula and the rear wheel load calculation formula, which are respectively set with the total weight W as a parameter, the total weight W is applied to the front wheel load calculation formula and the rear wheel load calculation formula respectively, so that the front wheel load Wf and the rear wheel load Wr can be easily calculated.

It is also possible to set the correlation relationship by a front wheel load ratio calculation formula and a rear wheel load ratio calculation formula in which the ratio to the total weight W is respectively set with the total weight W as a parameter. In this case, the front wheel load ratio and the rear wheel load ratio are obtained by applying the total weight W to the front wheel load ratio calculation formula and the rear wheel load ratio calculation formula respectively, so that the front wheel load and the rear wheel load can be easily calculated.

Moreover, the above embodiments can be applied to the vehicle wheel load estimation of various vehicle types other than a four-wheel drive vehicle.

In addition, it will be appreciated that those skilled in the art can implement the present invention in a form with various modifications added to the above embodiments without departing from the scope of the invention, and the present invention encompasses such modifications.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

EXPLANATION OF REFERENCE CHARACTERS

1 Four-wheel drive vehicle
2a,2b Front wheels
3a, 3b Rear wheels
6 Engine
7 Transmission
8 Front wheel differential gear device
9 Transfer case
10 Driving force transmission shaft
11 Coupling
12 Rear wheel differential gear device

We claim:

1. A wheel load estimation method of a four-wheel drive vehicle, comprising:
obtaining, through experiments conducted in advance, for each vehicle type of a plurality of vehicle types, a correlation relationship between a change in a total vehicle weight of each vehicle type as a number and a position of occupants and cargo change, and a corresponding change in at least one of a front wheel load and a rear wheel load;
storing the correlation relationship for a current vehicle in a non-volatile memory of a control unit of the current vehicle, the current vehicle being one of the plurality of vehicle types; and
via a processor of the control unit of the current vehicle:
calculating a current total vehicle weight of the current vehicle from a driving torque transmitted by a prime mover to driving wheels and a longitudinal acceleration of the current vehicle generated by the driving torque; and
estimating wheel loads of front wheels, rear wheels, or both of the current vehicle by applying the current total vehicle weight to the correlation relationship;
performing driving force distribution control using the estimated wheel loads for the current vehicle;
wherein the vehicle type is a four-wheel drive vehicle type; and
wherein the vehicle type is determined by the correlation relationship.

2. The wheel load estimation method of the four-wheel drive vehicle according to claim 1,
wherein the correlation relationship corresponding to the vehicles is referred to in estimating the wheel loads.

3. The wheel load estimation method of the four-wheel drive vehicle according to claim 1,
wherein, according to the correlation relationship, the wheel load of the front wheels or the rear wheels is specified by a linear function which takes the current total vehicle weight as a variable.

4. The wheel load estimation method of the four-wheel drive vehicle according to claim 1,
wherein the control unit estimates a wheel load of main driving wheels, to which a driving force of the prime mover is transmitted without passing through a coupling, in estimating the wheel load.

5. The wheel load estimation method of the four-wheel drive vehicle according to claim 1, wherein
obtaining the correlation relationship is accomplished at least in part by:
placing movable loads of varying weights in varying positions in a plurality of loading conditions for each vehicle type of the plurality of vehicle types; and
measuring the front wheel load and the rear wheel load under the loading conditions for each vehicle type of the plurality of vehicle types.

6. The wheel load estimation method of claim 1, wherein the correlation relationship includes a front wheel correlation relationship and a rear wheel correlation relationship.

7. The wheel load estimation method of the four-wheel drive vehicle according to claim 6,
wherein the correlation relationship is as follows:

$$Wf=aW+b$$

wherein the Wf is the front wheel load,
W is the current total vehicle weight, and
a and b are constants; or $$Wr=cW+d$$

wherein Wr is the rear wheel load,
W is the current total vehicle weight, and
c and d are constants.

8. The wheel load estimation method of claim 1, further comprising:
determining that the current vehicle has stopped for a period of time that is equal to or more than a predetermined period of time.

9. The wheel load estimation method of claim 8, further comprising:
determining that the current vehicle is in a stable acceleration traveling state in the horizontal direction after determining that the current vehicle was stopped for the predetermined period of time; and
in response to determining that the current vehicle is in a stable acceleration traveling state in the horizontal direction after determining that the current vehicle was stopped, calculating the current total vehicle weight of the current vehicle.

10. A control unit of a four-wheel drive vehicle, comprising:
a non-volatile memory that stores a correlation relationship, wherein the correlation relationship has been selected from a plurality of correlation relationships for a plurality of vehicle types, the plurality of correlation relationships having been obtained through experiments conducted in advance, and each indicating a change in a total vehicle weight as a number and a position of occupants and cargo changes, and a corresponding change in at least one of a front wheel load and a rear wheel load for each type of vehicle;
one or more inputs configured to acquire a driving torque transmitted by a prime mover to driving wheels and a vehicle longitudinal acceleration generated by the driving torque, from one or more sensors; and
a processor configured to estimate the wheel loads of the front wheels, rear wheels or both for the current vehicle by calculating a current total vehicle weight from the driving torque and the vehicle longitudinal acceleration and applying the current total vehicle weight to a formula for the correlation relationship, wherein the processor is further configured to perform driving force distribution control using the estimated wheel loads for the current vehicle,
wherein vehicle type is determined by the correlation relationship between a total vehicle weight and at least one of the front wheel load and the rear wheel load.

11. The control unit of the four-wheel drive vehicle according to claim 10,
wherein the correlation relationship is as follows:

$$Wf=aW+b$$

wherein the Wf is the front wheel load,
W is the current total vehicle weight, and
a and b are constants; or $$Wr=cW+d$$

wherein the Wr is the rear wheel load,
W is the current total vehicle weight, and
c and d are constants.

12. The control unit of the four-wheel drive vehicle according to claim 10,
wherein, according to the correlation relationship, the wheel load of the front wheels or the rear wheels is specified by a linear function which takes the current total vehicle weight as a variable.

13. The control unit of the four-wheel drive vehicle according to claim 10,
wherein the control unit estimates a wheel load of main driving wheels, to which a driving force of the prime mover is transmitted without passing through a coupling.

* * * * *